Aug. 4, 1964  J. A. GUTOWSKI ETAL  3,143,196

DRIVER'S HATCH

Filed Dec. 19, 1961  2 Sheets-Sheet 1

JOSEPH A. GUTOWSKI
CHESTER A. PIOTROWSKI
INVENTORS

BY S.J. Rotondi
L. T. Dupont
and N. J. Latker
ATTORNEYS

Aug. 4, 1964    J. A. GUTOWSKI ETAL    3,143,196
DRIVER'S HATCH
Filed Dec. 19, 1961    2 Sheets-Sheet 2

JOSEPH A. GUTOWSKI
CHESTER A. PIOTROWSKI
INVENTORS

BY S. J. Rotondi
A. T. Dupont
and N. J. Latker
ATTORNEYS

3,143,196
DRIVER'S HATCH

Joseph A. Gutowski, Livonia, and Chester A. Piotrowski, Detroit, Mich., assignors, by mesne assignments, to the United States of America as represented by the Secretary of the Army
Filed Dec. 19, 1961, Ser. No. 160,678
10 Claims. (Cl. 189—46)

This invention relates to the driver's hatch of a track-laying vehicle.

More particularly, the object of our invention is to provide a hatch door that can be automatically urged into open position and then moved so as not to obstruct vision or exit through the hatch port.

Urging the hatch door open is accomplished by use of wound torsion bar. The bar is anchored at one end to the vehicle hull, while the other end is attached to a casing which encompasses the torsion bar. The hatch door engages this casing in such manner that as the hatch is rotated from open to closed position the torsion bar is wound through the casing. The hatch is maintained in closed position by a latching lever. When this lever is actuated to release, the door springs open to its original position.

Due to the design of the vehicle cupola, the hatch cannot be opened to a position where it does not obscure the driver's vision or impede his exit. This necessitates providing means which will enable the movement of the open hatch from above the hatch port. We accomplish this by furnishing longitudinal grooves along the length of the torsion bar casing. These grooves cooperate with the hatch door so as to enable manual movement of the hatch along the length of the casing and thus away from the hatch port.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Figure 1:
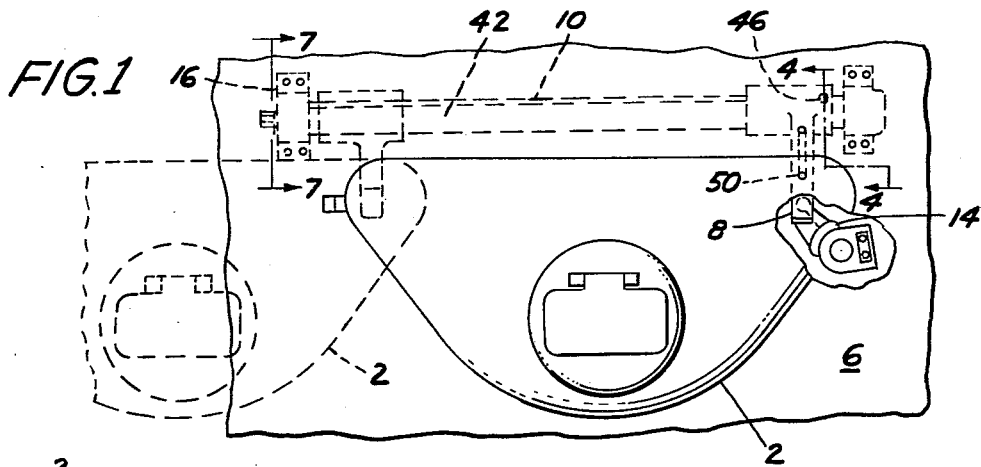

The practical embodiments of the invention are illustrated in the accompanying drawings, wherein:

FIG. 1 is a plan view of the vehicle deck showing the hatch door in closed position. The envelope outline shows the position of the hatch after it has been moved so as not to obstruct the port. Parts of the vehicle deck and hatch have been broken away so as to show the torsion bar casing and latch lever.

Figure 2:
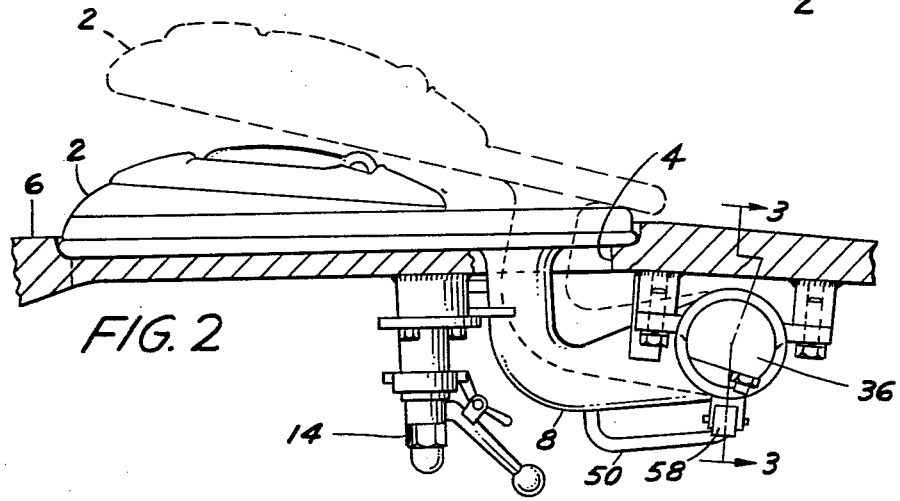

FIG. 2 is an elevational view of the hatch door in closed position. The envelope outline shows the position the hatch assumes after the latch lever has been actuated to release.

Figure 3:
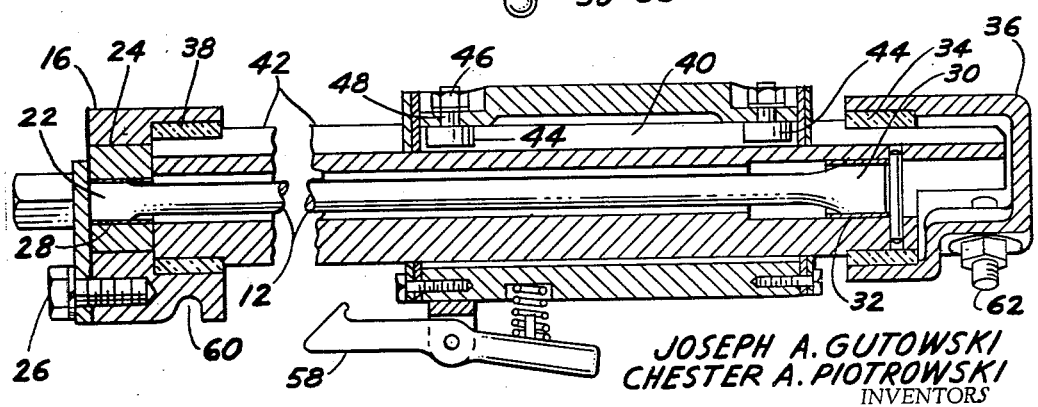
Figure 4:
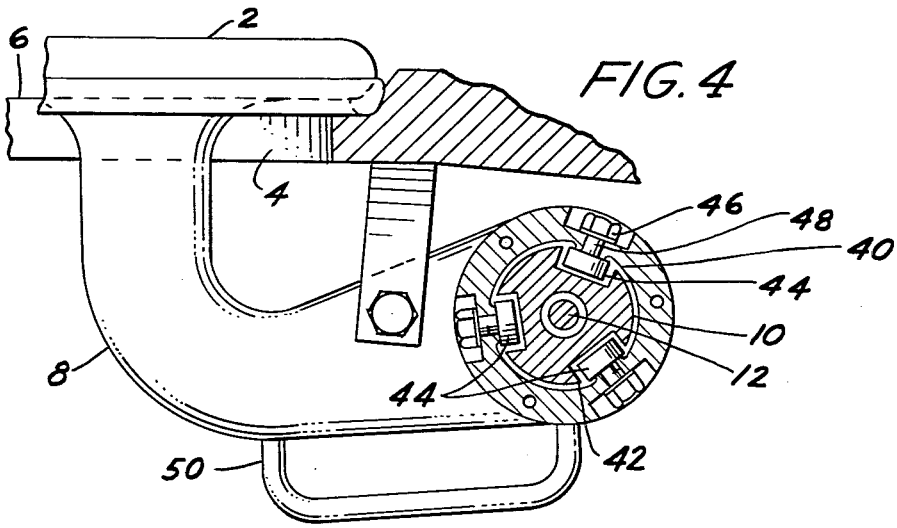
Figure 5:
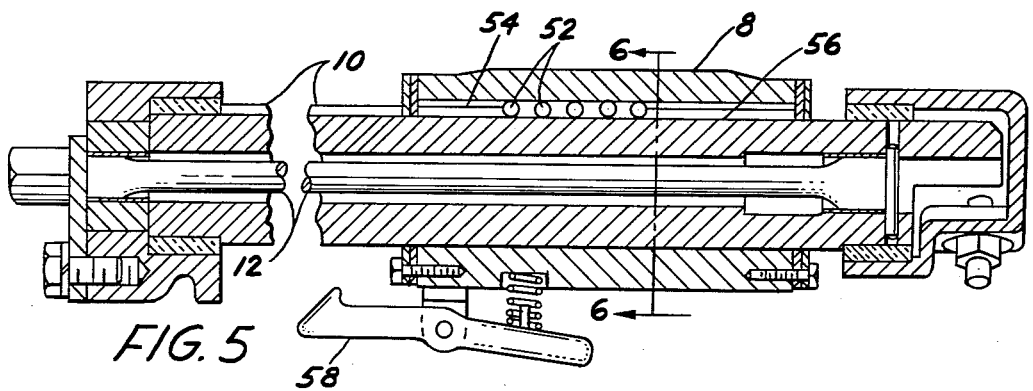
Figures 6, 7:
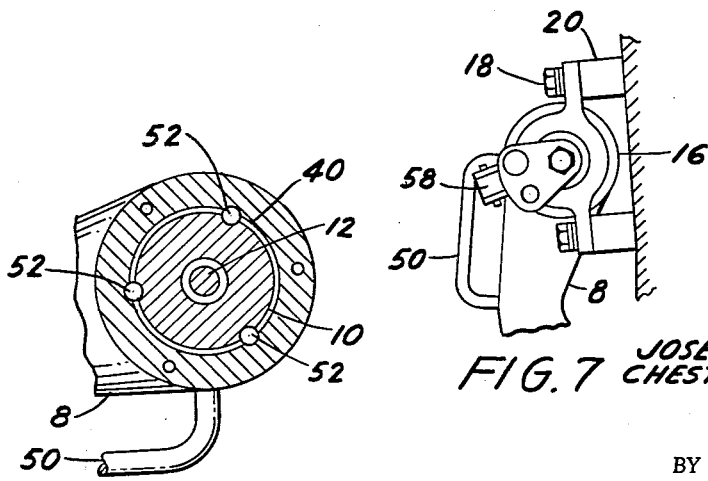

FIG. 3 is a section taken through line 3—3 of FIG. 2.
FIG. 4 is a section taken through line 4—4 of FIG. 1.
FIG. 5 is a view showing alternate means for engaging the hatch door arm to the torsion bar casing.
FIG. 6 is a section taken through line 6—6 of FIG. 5.
FIG. 7 is a section taken through line 7—7 of FIG. 1.

Referring now generally to the drawings, the hatch door is indicated by the reference numeral 2. As the hatch door 2 closes port 4 in vehicle deck 6, hatch arm 8 rotates torsion bar casing 10 which in turn winds up torsion bar 12. The torsion bar 12 is kept in wound condition by maintaining the hatch 2 in closed position using latching lever 14, the specific details of which are shown but not described as per se they are not considered part of the invention. When lever 14 is actuated to release the torsion bar 12 unwinds urging door 2 open to its original position.

More specifically, this operation is accomplished by anchoring torsion bar 12 to the underside of vehicle deck 6 through housing 16. As best seen from FIG. 7, housing 16 is fastened to the deck 6 by bolts 18 which pass through spacers 20, provided to insure proper spacing between housing 16 and the underside of deck 6.

The torsion bar 12, as seen from FIG. 3, is engaged at its end 22 to core member 24, which in turn is fastened to housing 16 by bolt 26. The bar 12 and core 24 are engaged by corresponding splines 28 located at bar end 22 and within core 24. Core 24 is initially rotatable within housing 16 so as to enable winding up the torsion bar. This will be discussed in greater detail hereinafter.

End 30 of torsion bar 12 is joined to torsion bar casing 10 by corresponding splines 32 located at bar end 30 and within casing 10. Casing 10 is rotatably mounted through bearing 34 to housing 36. Housing 36, as best seen from FIG. 2, is mounted on the underside of deck 6 in the same manner as housing 16.

The opposite end of casing 10 is rotatably supported by bearing 38 of housing 16. Thus, any force tending to turn casing 10 about its longitudinal axis will rotate the casing within bearings 34 and 38. The rotation of the casing 10 will carry with it end 30 of torsion bar 12 and will thus twist the bar in relation to fixed end 22.

Winding the torsion bar in this manner is accomplished by moving hatch door 2 from open position (where the torsion bar is unwound) to closed position, arm 8 transmitting this movement to casing 10. Arm 8 is integrally attached to the underside of hatch door 2 by welding. The arm is engaged to casing 10 by insertion of casing 10 through arm opening 40. Casing 10 is provided with grooves 42 adapted to receive cylindrical heads 44 of bolts 46. Projection of heads 44 into grooves 42 insures rotation of casing 10 with arm 8.

Heads 44 are made rotatable relative to shank 48 in order to facilitate moving hatch door 2 along longitudinal grooves 42. The door is best moved by use of handle 50 welded to arm 8.

Casing 10 is made stiff relative to torsion bar 12. This eliminates spiraling of grooves 42 due to the repeated torqueing of casing 10 and thus prevents binding of sliding hatch arm 8.

FIG. 5 shows an alternate means of engaging the hatch arm 8 to the torsion bar casing 10. Ball bearings 52 project into grooves 54 of arm 8 and grooves 56 of casing 10 and thus serve to transmit angular movement of arm 8 to casing 10. They also serve to move hatch door 2 along longitudinal grooves 56.

Both FIGS. 2 and 3 illustrate latching lever 58 designed to cooperate with recess 60 so as to maintain hatch door 2 in the position shown by the envelope outline of FIG. 1.

A bracket (not shown), with a slot adapted to receive the edge of hatch door 2 when the door is in the position shown by the envelope outline of FIG. 1, can be provided on vehicle deck 6 so as to eliminate angular movement of the hatch which might be caused by undulation of the vehicle. Thus, the bracket and the latch lever 58 would cooperate to maintain the hatch 2 in the position shown by the envelope outlines shown in FIGS. 1 and 2.

The initial wind-up of torsion bar 12 is accomplished with the hatch 2 in closed position and the torsion bar 12 splined to casing 10 and core 24. Core 24 is then turned until bolt 26 can be engaged to housing 16, as seen in FIG. 7. Limit set screw 62, shown in FIG. 3, is provided so as to limit the rotation of casing 10 and thus the opening of hatch 2.

If hatch 2 will not open to the desired angle, the tortion bar 12 can be reindexed by rotating the torsion bar clockwise one tooth in relation to the splines of casing 10. This will increase the wind-up angle of the torsion bar permitting the bar to exert a greater lifting force.

We claim:

1. In a vehicle body having a vertically swinging hatch door, a torsion bar fixed at one end to said body, a torsion bar casing encompassing said torsion bar and fixed to the end of said torsion bar opposite that end which is fixed to said body, a hinge arm fixed at one end to said hatch door, said casing passing through said hinge arm at its opposite end, and means provided to cooperate with said hinge arm and said casing so as to maintain said torsion bar in a torsionally deflected condition when said hatch door is in closed position and permitting longitudinal movement of said hinge arm and attached hatch door along said torsion bar casing when said hatch door is in open position.

2. The vehicle body of claim 1 wherein said means comprise a bolt through said arm, said bolt provided with a head projecting into a longitudinal groove provided in said casing.

3. The vehicle body of claim 2 wherein said bolt head is rotatable about the axis of said bolt.

4. The vehicle body of claim 1 wherein said means comprise a ball bearing projecting into said arm and into a longitudinal groove provided in said casing.

5. In a vehicle body having a vertically swinging hatch door, a pair of transversely spaced housings fixed to the body, a torsion bar casing, a torsion bar extending co-axially through said casing, said torsion bar casing being rotatably supported at each end by said housing, said torsion bar being fixed ajacent one end to one of said housings and adjacent its opposite end to said torsion bar casing, a hinge arm fixed at one end to said hatch door, said torsion bar casing passing through said hinge arm at its opposite end, and means provided to cooperate with said hinge arm and said casing so as to maintain said torsion bar in a torsionally deflected condition when said hatch door is in closed position and permitting longitudinal movement of said hinge arm and attached hatch door along said torsion bar casing when said hatch door is in open position.

6. The vehicle body of claim 5 wherein said means comprise a bolt through said arm, said bolt provided with a head projecting into a longitudinal groove provided in said casing.

7. The vehicle body of claim 6 wherein said bolt head is rotatable about the axis of said bolt.

8. The vehicle body of claim 5 wherein said means comprise a ball bearing projecting into said arm and into a longitudinal groove provided in said casing.

9. The vehicle body of claim 7 wherein said housings are fixed to the inner surface of said body.

10. The vehicle body of claim 8 wherein said housings are fixed to the inner surface of said body.

References Cited in the file of this patent

UNITED STATES PATENTS

| | | |
|---|---|---|
| 2,002,894 | Kahn | May 28, 1935 |
| 2,904,853 | Devery | Sept. 22, 1959 |